(12) United States Patent
Davis

(10) Patent No.: US 9,462,655 B1
(45) Date of Patent: Oct. 4, 2016

(54) CIRCUIT AND METHOD FOR MONITORING FUNCTIONALITY OF AN ELECTRONIC SURGE SUPPRESSOR

(71) Applicant: UNIVERSAL LIGHTING TECHNOLOGIES, INC., Madison, AL (US)

(72) Inventor: Keith Davis, Madison, AL (US)

(73) Assignee: UNIVERSAL LIGHTING TECHNOLOGIES, INC., Madison, AL (US)

( * ) Notice: Subject to any disclaimer, the term of this patent is extended or adjusted under 35 U.S.C. 154(b) by 0 days.

(21) Appl. No.: 14/504,806

(22) Filed: Oct. 2, 2014

Related U.S. Application Data

(60) Provisional application No. 61/886,876, filed on Oct. 4, 2013.

(51) Int. Cl.
*H05B 37/02* (2006.01)
*H05B 33/08* (2006.01)

(52) U.S. Cl.
CPC ...... *H05B 33/0887* (2013.01); *H05B 33/0845* (2013.01); *H05B 37/02* (2013.01)

(58) Field of Classification Search
CPC .................................................. H05B 37/02
USPC ................................ 315/291, 294, 307, 308
See application file for complete search history.

(56) References Cited

U.S. PATENT DOCUMENTS

| | | | | |
|---|---|---|---|---|
| 6,259,215 B1* | 7/2001 | Roman | .............. | H05B 41/2887 315/224 |
| 8,698,407 B1* | 4/2014 | Chen | .................. | H05B 33/0812 315/185 R |
| 2012/0268031 A1* | 10/2012 | Zhou | .................. | H05B 33/0815 315/291 |
| 2013/0049589 A1* | 2/2013 | Simi | .................. | H05B 33/0815 315/85 |
| 2014/0132184 A1* | 5/2014 | Gaknoki | ........... | H02M 3/33507 315/307 |

* cited by examiner

*Primary Examiner* — Tung X Le
(74) *Attorney, Agent, or Firm* — Patterson Intellectual Property Law, PC; Mark J. Patterson; Gary L. Montle

(57) ABSTRACT

A surge protection device provides a dimming control signal to an LED driving system upon failure of surge protection components. Impedance networks are coupled between respective first, second and third input lines for an AC mains. The impedance networks include thermal fuses and metal oxide varistors, with a dimming control circuit having a resistive network coupled between each respective series circuit of fuses and MOV's. The resistive network generates a 0-10V analog dimming signal to an LED device controller, wherein a lighting device operates in full lighting mode while the surge protection device is in normal, high impedance mode, but operates in a dimming mode when one or more of the impedance network devices fail and cause the 0-10V signal to drop below 10 volts. Detection of a dimmed but operable lighting device may serve as warning to an operator that the associated surge protection device component should be replaced.

15 Claims, 2 Drawing Sheets

CIRCUIT AND METHOD FOR MONITORING FUNCTIONALITY OF AN ELECTRONIC SURGE SUPPRESSOR

CROSS-REFERENCES TO RELATED APPLICATIONS

This application claims benefit of U.S. Provisional Patent Application No. 61/886,876, dated Oct. 4, 2013, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to surge protection devices. More particularly, the present invention relates to surge protection devices for LED driver systems and a method for alerting users as to the need to replace failed surge protection components.

Outdoor electronic light emitting diode (LED) drivers are subject to significant surges on the input lines. In many conventional applications, electronic LED drivers, and the LEDs themselves, are protected by surge suppressor modules which are connected in parallel with the inputs of the LED drivers. Such surge suppressor modules also conventionally include clamping devices such as metal oxide varistors (MOVs). However, the performance of surge suppressors containing MOVs degrades with each surge event. Further, the MOVs in the surge suppressor can fail with no external indication. This failure leaves the fixture unprotected for any subsequent surge event.

It would be desirable to provide an inexpensive method for an operator to determine the status of a surge suppression system that is usually inconveniently located, e.g., at the top of a pole. This is especially problematic wherein determining system status requires a physical measurement.

It would further be desirable that indication of a failed surge suppressor can allow replacement of an inexpensive component in an expensive system before damage occurs to the remaining system.

BRIEF SUMMARY OF THE INVENTION

The following disclosure demonstrates a novel method of detecting failed MOVs or equivalent components in a surge suppressor device by performing a dimming control operation in the LED driver to alert the operator to the need to replace the surge suppressor. This indication of a failed surge suppressor may be implemented before damage occurs to the LED driver or associated LEDs.

In one embodiment, impedance networks are coupled between respective first, second and third input lines for an AC mains. The impedance networks may include thermal fuses and metal oxide varistors, with a dimming control circuit having a resistive network coupled between each respective series circuit of fuses and MOV's. The resistive network generates a 0-10V analog dimming signal to an LED device controller. A lighting device operates in full lighting mode while the surge protection device is in normal, high impedance mode, but operates in a dimming mode when one or more of the impedance network devices fail and cause the 0-10V signal to drop below 10 volts. Detection of a dimmed but operable lighting device may serve as warning to an operator that the associated surge protection device component should be replaced.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Figure 1:
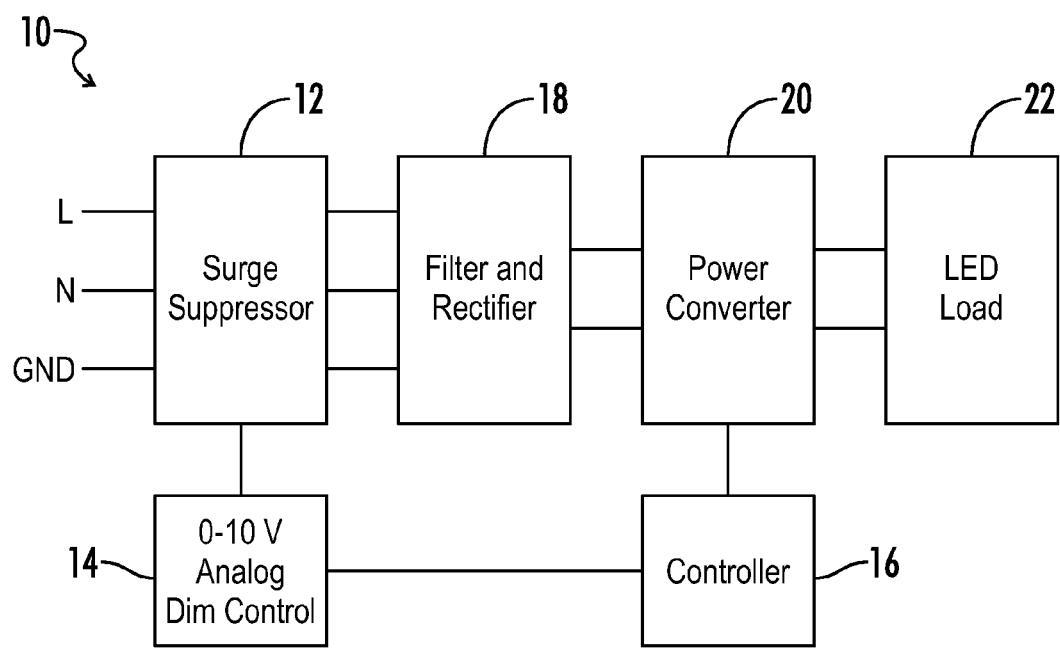
FIG. 1 is a block diagram representing an LED driving system including a surge protection device according to one embodiment of the present invention.

Referring first to FIG. 1, one or more exemplary embodiments of a lighting system 10 having a surge suppressor 12 or surge protection device 12 (as the terms may be interchangeably used herein) are shown. The lighting system 10 may include a filtering and rectifying circuit 18, a dimming control circuit 14, and a controller 16 associated with a power converter 20 such as an LED driver having one or more switching elements for driving an LED load 22.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The term "LED driver" or "LED driver circuit" unless otherwise defined herein may generally refer to a device, circuit, or combination of elements as known to one of skill in the art for driving a load comprising one or more light-emitting diodes (LEDs), potentially including but not limited to any specific combination of components comprising a power factor correction (PFC) stage, DC-DC power converters of various forms such as buck, boost, buck-boost and the like.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Figure 2:
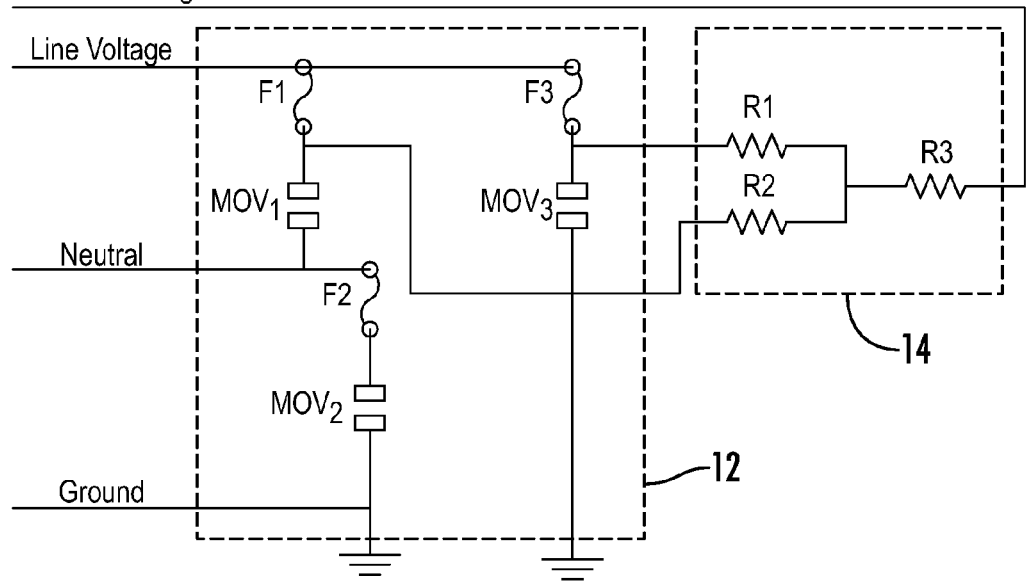
FIG. 2 is a circuit diagram representing an embodiment of the surge protection device according to the present invention.

Referring now to FIG. 2, an electronic surge suppressor 12 as disclosed herein may be connected in parallel to the LED driver 20. The surge suppressor 12 in an exemplary embodiment may include impedance networks coupled between one or more pairs of input lines (e.g., L-N, L-G, N-G), with each impedance network including a clamping device such as a metal oxide varistor (MOV) connected in series with a thermal cutoff device such as a thermal fuse F.

In the example shown, a first impedance network includes a first thermal fuse F1 coupled on a first end to the line voltage input and on a second end to a first metal oxide varistor MOV1, which is further coupled to a neutral input line. A second impedance network includes a second thermal fuse F2 coupled on a first end to the neutral input line and on a second end to a second metal oxide varistor MOV2, which is further coupled to a ground input line. A third impedance network includes a third thermal fuse F3 coupled on a first end to the line voltage input and on a second end to a third metal oxide varistor MOV3, which is further coupled to the ground input line.

In normal operation, the MOVs are in a high impedance state and do not affect the circuit. A particular configuration and associated component values for a dimming control circuit 14, such as the resistive network R1-R3 shown in FIG. 2, for generating the '0-10 V Analog Dim Control' output may be chosen by one of skill in the art to ensure that the voltage is greater than 10 V. That output may be connected to an analog dimming control input for the controller of the LED driver. Under this normal operating condition, the LED driver is operating at maximum brightness.

More particularly regarding the one or more impedance networks, the respective thermal fuses are in place to protect the circuit upon failure of an MOV. Because an MOV fails in a short circuit failure mode, the thermal fuse quickly heats and opens to protect the circuit from an over-current situation. When the thermal fuse opens, the voltage level of the '0-10 V Analog Dim Control' drops to a relatively low value and causes the LED driver controller to correspondingly generate driver signals to the switching element for dimming the lighting output of the LED load. When the operator detects a dimmed but operating LED, it may be understood that the surge suppressor should be replaced for continued surge protection of the system.

The previous detailed description has been provided for the purposes of illustration and description. Thus, although there have been described particular embodiments of an invention as disclosed herein, it is not intended that such references be construed as limitations upon the scope of this invention except as set forth in the following claims.

What is claimed is:

1. A surge protection device for a dimmable lighting system, the device comprising:
   a first input line;
   a first impedance network coupled to the first input line;
   a dimming control circuit coupled to the first impedance network and configured in a first impedance mode to provide an analog output associated with full lighting output of an LED device, and in a second impedance mode to provide an analog output associated with dimmed lighting output of the LED device;
   a second input line, wherein the first impedance network is coupled between the first input line and the second input line;
   the first impedance network comprising a thermal cutoff device coupled in series with a clamping device, the dimming control circuit coupled to a node between the thermal cutoff device and the clamping device; and
   the dimming control circuit comprising a resistor network which provides a 0-10 V analog dimming input signal to an analog dimming input terminal for an LED device controller.

2. The surge protection device of claim 1, the first input line comprising a line voltage input and the second input line comprising a neutral.

3. The surge protection device of claim 1, wherein the first impedance mode is associated with a high impedance for the impedance circuits, the 0-10V analog dimming input signal being at least 10 volts in said first impedance mode; and
   further wherein the second impedance mode is associated with a low impedance relative to the first impedance mode, the 0-10V analog dimming input signal being less than 10 volts in the second impedance mode.

4. The surge protection device of claim 1, further comprising
   a third input line;
   a second impedance network coupled between the first input line and the third input line; and
   the dimming control circuit is coupled to one or more of the first impedance network and the second impedance network.

5. The surge protection device of claim 4, the first input line comprising a line voltage input, the second input line comprising a neutral, and the third input line comprising a ground.

6. The surge protection device of claim 5, further comprising a third impedance network coupled between the second input line and the third input line.

7. The surge protection device of claim 6, wherein each of the first, second and third impedance networks comprise a thermal cutoff device coupled in series with a clamping device, the dimming control circuit coupled to nodes in the first and second impedance networks between each of the respective thermal cutoff devices and clamping devices.

8. The surge protection device of claim 7, wherein each of the thermal cutoff devices in the first, second and third impedance networks comprises a thermal fuse.

9. The surge protection device of claim 7, wherein each of the clamping devices in the first, second and third impedance networks comprises a metal oxide varistor.

10. The surge protection device of claim 7, wherein:
the dimming control circuit comprising a resistor network;
a first end of a first resistor is coupled to the node between the thermal cutoff device and the clamping device in the first impedance network,
a first end of a second resistor is coupled to the node between the thermal cutoff device and the clamping device in the second impedance network,
a first end of a third resistor is coupled to the respective second ends of the first and second resistors, and
a second end of the third resistor provides a 0-10 V analog dimming input signal to an analog dimming input terminal for an LED device controller.

11. The surge protection device of claim 10, wherein:
the first impedance mode is associated with a high impedance for the impedance circuits, the 0-10V analog dimming input signal being at least 10 volts in said first impedance mode; and
the second impedance mode is associated with a relatively low impedance for the impedance circuits, the 0-10V analog dimming input signal being less than 10 volts in said second impedance mode.

12. An LED lighting system comprising:
first, second and third line terminals for receiving an AC mains input;
a rectifying circuit configured to convert AC power received via first, second and third input lines coupled to the respective first, second, and third line terminals into DC power;
an LED driver circuit comprising a controller configured to regulate operation of a switching element for driving an LED load;
a surge protection device comprising:
 a first impedance network coupled to the first input line; and
 a dimming control circuit coupled to the first impedance network and configured in a first impedance mode to provide the controller with an analog output associated with full lighting output of the LED load, and in a second impedance mode to provide the controller with an analog output associated with dimmed lighting output of the LED load;
the first impedance network comprises a thermal cutoff device coupled in series with a clamping device between the first and second input lines, the dimming control circuit coupled to a node between the thermal cutoff device and the clamping device; and
the dimming control circuit comprises a resistor network which provides a 0-10 V analog dimming input signal to an analog dimming input terminal for the controller.

13. The LED lighting system of claim 12, wherein:
the first impedance mode is associated with a high impedance for the impedance circuits, the 0-10V analog dimming input signal being at least 10 volts in said first impedance mode; and
the second impedance mode is associated with a relatively low impedance for the impedance circuits, the 0-10V analog dimming input signal being less than 10 volts in said second impedance mode.

14. The LED lighting system of claim 12, wherein:
the first impedance network is coupled between the first input line and the second input line;
the surge protection device further comprises a second impedance network coupled between the first input line and a third input line, and a third impedance network coupled between the second input line and the third input line;
each of the first, second and third impedance networks comprises a thermal cutoff device coupled in series with a clamping device, the dimming control circuit coupled to at least nodes in the first and second impedance networks between each of the respective thermal cutoff devices and clamping devices;
each of the thermal cutoff devices in the first, second and third impedance networks comprises a thermal fuse; and
each of the clamping devices in the first, second and third impedance networks comprises a metal oxide varistor.

15. A method of determining surge protection capability in an LED lighting system, the method comprising:
providing a surge protection device connected in parallel with input connections of an LED driver circuit, the surge protection device in normal operating mode comprising a high impedance state; and
responsive to a short circuit failure mode,
 causing an analog dimming control signal to a controller of the LED driver circuit to be reduced from a substantially maximum value, and
 generating driver signals to a switching element of the LED driver circuit for operating an LED load at a dimmed lighting output.

* * * * *